United States Patent
Kawai (10) Patent No.: US 12,384,342 B2
(45) Date of Patent: Aug. 12, 2025

(54) BRAKING CONTROL DEVICE FOR VEHICLE

(71) Applicant: ADVICS CO., LTD., Kariya (JP)

(72) Inventor: Takuto Kawai, Kariya (JP)

(73) Assignee: ADVICS CO., LTD., Kariya (JP)

( * ) Notice: Subject to any disclaimer, the term of this patent is extended or adjusted under 35 U.S.C. 154(b) by 51 days.

(21) Appl. No.: 18/291,024

(22) PCT Filed: Jul. 29, 2022

(86) PCT No.: PCT/JP2022/029369
§ 371 (c)(1),
(2) Date: Jan. 22, 2024

(87) PCT Pub. No.: WO2023/008573
PCT Pub. Date: Feb. 2, 2023

(65) Prior Publication Data
US 2024/0326764 A1    Oct. 3, 2024

(30) Foreign Application Priority Data
Jul. 29, 2021    (JP) .................................. 2021-124625

(51) Int. Cl.
*B60T 8/92*     (2006.01)
*B60T 13/74*    (2006.01)
*B60T 17/22*    (2006.01)

(52) U.S. Cl.
CPC .............. *B60T 8/92* (2013.01); *B60T 13/741* (2013.01); *B60T 17/221* (2013.01); *B60T 2270/402* (2013.01); *B60T 2270/413* (2013.01)

(58) Field of Classification Search
CPC ........ B60T 8/92; B60T 13/741; B60T 17/221; B60T 2270/402; B60T 2270/413
See application file for complete search history.

(56) References Cited

U.S. PATENT DOCUMENTS

2010/0204894 A1     8/2010  Strengert et al.
2022/0388487 A1*   12/2022  Hwang ..................... B60T 7/12
(Continued)

FOREIGN PATENT DOCUMENTS

JP    2010-534590 A    11/2010

OTHER PUBLICATIONS

International Search Report mailed on Oct. 4, 2022 in PCT/JP2022/029369 filed on Jul. 29, 2022, 2 pages.

*Primary Examiner* — Jacob M Amick
(74) *Attorney, Agent, or Firm* — Oblon, McClelland, Maier & Neustadt, L.L.P.

(57) ABSTRACT

When it is diagnosed that a braking control device 50 functions normally, a command unit **70*f* transmits a braking force command value to drive units 60*a*, 60*b*, and a command unit 70*r* transmits the braking force command value to drive units 60*c*, 60*d*. Then, the drive units 60*a*, 60*b* drives braking mechanisms 30*a*, 30*b* according to the command value transmitted by the command unit 70*f*, and the drive units 60*c*, 60*d* drives braking mechanisms 30*c*, 30*d* according to the command value transmitted by the command unit 70*r*. Meanwhile, when it is diagnosed that the braking control device 50 does not function normally, at least one of the command units 70*f*, 70*r* executes backup control for compensating for a shortage of a braking force of a vehicle 10 for a braking request, which is caused by the braking control device 50** not functioning normally.

10 Claims, 3 Drawing Sheets

| DIAGNOSTIC RESULT PATTERN | DIAGNOSTIC RESULT | | | | COMMAND VALUE TRANSMISSION MODE |
|---|---|---|---|---|---|
| | FIRST COMMAND UNIT ↓ FIRST DRIVE UNIT | FIRST COMMAND UNIT ↓ SECOND DRIVE UNIT | SECOND COMMAND UNIT ↓ FIRST DRIVE UNIT | SECOND COMMAND UNIT ↓ SECOND DRIVE UNIT | |
| FIRST PATTERN | NORMAL | — | — | NORMAL | FIRST COMMAND UNIT → FIRST DRIVE UNIT SECOND COMMAND UNIT →SECOND DRIVE UNIT |
| SECOND PATTERN | NORMAL | NORMAL | — | ABNORMAL | FIRST COMMAND UNIT → FIRST DRIVE UNIT ⋯→SECOND DRIVE UNIT |
| THIRD PATTERN | NORMAL | ABNORMAL | — | ABNORMAL | FIRST COMMAND UNIT → FIRST DRIVE UNIT |
| FOURTH PATTERN | ABNORMAL | NORMAL | NORMAL | ABNORMAL | FIRST COMMAND UNIT → SECOND DRIVE UNIT SECOND COMMAND UNIT →FIRST DRIVE UNIT |
| FIFTH PATTERN | ABNORMAL | NORMAL | ABNORMAL | ABNORMAL | FIRST COMMAND UNIT → SECOND DRIVE UNIT |
| SIXTH PATTERN | ABNORMAL | — | NORMAL | NORMAL | SECOND COMMAND UNIT → FIRST DRIVE UNIT →SECOND DRIVE UNIT |
| SEVENTH PATTERN | ABNORMAL | — | ABNORMAL | NORMAL | SECOND COMMAND UNIT → SECOND DRIVE UNIT |
| EIGHTH PATTERN | ABNORMAL | ABNORMAL | NORMAL | ABNORMAL | SECOND COMMAND UNIT → FIRST DRIVE UNIT |

(56) References Cited

U.S. PATENT DOCUMENTS

| | | | |
|---|---|---|---|
| 2023/0042441 A1* | 2/2023 | Fujita | B60T 13/741 |
| 2023/0129690 A1* | 4/2023 | Lee | B60T 8/885 |
| | | | 701/34.4 |

* cited by examiner

| DIAGNOS-TIC RESULT PATTERN | DIAGNOSTIC RESULT | | | | COMMAND VALUE TRANSMISSION MODE |
|---|---|---|---|---|---|
| | FIRST COMMAND UNIT ↕ FIRST DRIVE UNIT | FIRST COMMAND UNIT ↕ SECOND DRIVE UNIT | SECOND COMMAND UNIT ↕ FIRST DRIVE UNIT | SECOND COMMAND UNIT ↕ SECOND DRIVE UNIT | |
| FIRST PATTERN | NORMAL | — | — | NORMAL | FIRST COMMAND UNIT → FIRST DRIVE UNIT SECOND COMMAND UNIT →SECOND DRIVE UNIT |
| SECOND PATTERN | NORMAL | NORMAL | — | ABNORMAL | FIRST COMMAND UNIT → FIRST DRIVE UNIT →SECOND DRIVE UNIT |
| THIRD PATTERN | NORMAL | ABNORMAL | — | ABNORMAL | FIRST COMMAND UNIT → FIRST DRIVE UNIT |
| FOURTH PATTERN | ABNORMAL | NORMAL | NORMAL | ABNORMAL | FIRST COMMAND UNIT → SECOND DRIVE UNIT SECOND COMMAND UNIT →FIRST DRIVE UNIT |
| FIFTH PATTERN | ABNORMAL | NORMAL | ABNORMAL | ABNORMAL | FIRST COMMAND UNIT → SECOND DRIVE UNIT |
| SIXTH PATTERN | ABNORMAL | — | NORMAL | NORMAL | SECOND COMMAND UNIT → FIRST DRIVE UNIT →SECOND DRIVE UNIT |
| SEVENTH PATTERN | ABNORMAL | — | ABNORMAL | NORMAL | SECOND COMMAND UNIT → SECOND DRIVE UNIT |
| EIGHTH PATTERN | ABNORMAL | ABNORMAL | NORMAL | ABNORMAL | SECOND COMMAND UNIT → FIRST DRIVE UNIT |

BRAKING CONTROL DEVICE FOR VEHICLE

TECHNICAL FIELD

The present disclosure relates to a braking control device for a vehicle.

BACKGROUND ART

In PTL 1, an example of a brake system is described, and the brake system separately regulates braking forces that are applied to four wheels provided to a vehicle. This brake system includes: four brake actuators, each of which corresponds to respective one of the four wheels; and four actuator control devices, each of which corresponds to respective one of the four brake actuators. The brake system further includes a system control device that derives a braking force command value. The system control device has two computers. When the braking force command value is transmitted from such a system control device to the actuator control device, the actuator control device drives the brake actuator corresponding thereto on the basis of the received command value.

There is a case where at least one control device of the system control device and the actuator control devices fails during travel of the vehicle, to which the above brake system is mounted. In this case, the actuator control device that does not fail drives the brake actuator corresponding thereto and thereby applies the braking force to the wheels. In this way, when at least one of the control devices fails, the vehicle can be stopped to ensure safety of an occupant.

CITATION LIST

Patent Literature

PTL 1: JP2010-534590A

BRIEF SUMMARY

Technical Problem

In recent years, in regard to the brake system with such a redundant configuration that the system control device has the plural computers, it has been desired to enable regulating the vehicle braking force in a manner to meet a driver's intention even when abnormality occurs to at least one of the control devices as described above. However, with the brake system described in PTL 1, there is a possibility that the vehicle braking force cannot be regulated in the manner to meet the driver's intention when the abnormality occurs to at least one of the control devices.

Solution to Problem

Hereinafter, means to solve the above problem and operational effects thereof will be described.

A braking control device for a vehicle that solves the above problem is a braking control device for a vehicle, the braking control device being applied to a vehicle including: a first braking mechanism that applies a braking force to a first wheel; and a second braking mechanism that applies a braking force to a second wheel. The braking control device for a vehicle includes: a first drive unit that drives the first braking mechanism according to a first command value and thereby applies the braking force to the first wheel, the first command value being a braking force command value to be applied to the first wheel; a second drive unit that drives the second braking mechanism according to a second command value and thereby applies the braking force to the second wheel, the second command value being a braking force command value to be applied to the second wheel; a first command unit that derives the first command value and the second command value on the basis of a braking request as a request for the braking force on the vehicle, can transmit the first command value to the first drive unit, and can transmit the second command value to the second drive unit; a second command unit that derives the first command value and the second command value on the basis of the braking request, can transmit the first command value to the first drive unit, and can transmit the second command value to the second drive unit; and a diagnostic unit that diagnoses whether the braking control device functions normally. In the case where the diagnostic unit diagnoses that the braking control device functions normally, the first command unit transmits the first command value to the first drive unit, the first drive unit drives the first braking mechanism according to the first command value transmitted by the first command unit, the second command unit transmits the second command value to the second drive unit, and the second drive unit drives the second braking mechanism according to the second command value transmitted by the second command unit. In the case where the diagnostic unit diagnoses that the braking control device does not function normally, at least one of the first command unit and the second command unit executes backup control for compensating for a shortage of the braking force of the vehicle for the braking request, which is caused by the braking control device not functioning normally.

In the case where some abnormality occurs to the braking control device, there is a possibility that the braking force corresponding to a required value of the braking force cannot be generated to the vehicle. In regard to this point, in the above configuration, when it is diagnosed that the braking control device does not function normally, the backup control is executed. In this way, it is possible to suppress the shortage of the braking force, which is caused by the braking control device not functioning normally. Therefore, according to the configuration, even in the case where some abnormality occurs to the braking control device, the braking force of the vehicle can be regulated according to the required value of the braking force.

DESCRIPTION OF EMBODIMENTS

A description will hereinafter be made on an embodiment of a braking control device for a vehicle with reference to the drawings.

<Vehicle>

Figure 1:
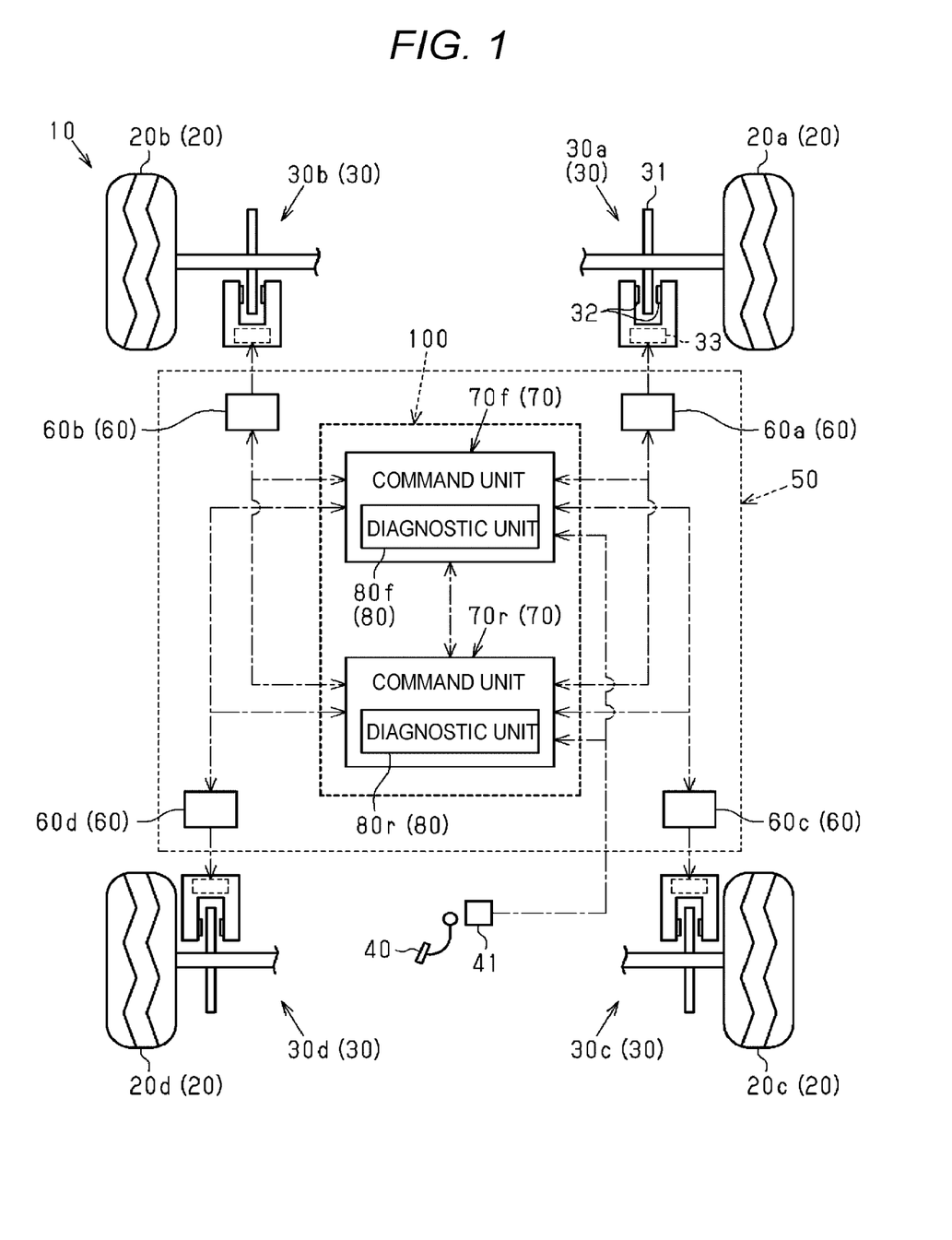
FIG. 1 is a schematic view of a vehicle that includes a braking control device in an embodiment.

FIG. 1 illustrates a vehicle 10 that includes a braking control device 50. The vehicle 10 includes, in addition to the braking control device 50, four wheels 20 (20a to 20d), four braking mechanisms 30 (30a to 30d), a braking operation member 40, and a stroke sensor 41.

<Braking Mechanism 30>

The braking mechanism 30 applies a braking force to the corresponding wheel 20. Of the four braking mechanisms 30, the braking mechanism 30a corresponds to the right front wheel 20a, and the braking mechanism 30b corresponds to the left front wheel 20b. In addition, the braking mechanism 30c corresponds to the right rear wheel 20c, and the braking mechanism 30d corresponds to the left rear wheel 20d.

As illustrated in FIG. 1, the braking mechanism 30 includes: a rotary body 31 that rotates together with the wheel 20; a friction member 32 that does not rotate together with the wheel 20; and an electric motor 33 that drives the friction member 32. By driving the electric motor 33, the friction member 32 is displaced in a direction to approach the rotary body 31 or is displaced in a direction away from the rotary body 31. The braking force is applied to the wheel 20 when the friction member 32 is brought close to the rotary body 31. When a force that presses the friction member 32 against the rotary body 31 is increased by driving the electric motor 33, the braking force that is applied to the wheel 20 is increased. The braking mechanism 30 is an electromechanical brake (EMB), for example. In this embodiment, the braking mechanism 30 is a disc brake. However, in another embodiment, the braking mechanism 30 may be a drum brake.

<Braking Operation Member 40>

As illustrated in FIG. 1, the braking operation member 40 is a member that is operated when a driver requests braking for the vehicle 10. The braking operation member 40 is a brake pedal, for example. The stroke sensor 41 detects an operation amount of the braking operation member 40 by the driver. The stroke sensor 41 outputs a detection signal indicating the detected operation amount to the braking control device 50.

Instead of the stroke sensor 41, an operation force sensor may be provided to detect an operation force that is input to the braking operation member 40 from the driver, and a detection signal of the operation force sensor may be input to the braking control device 50. Needless to say, the detection signals of both the stroke sensor 41 and the operation force sensor may be input to the braking control device 50.

<Braking Control Device 50>

As illustrated in FIG. 1, the braking control device 50 includes: the same number of drive units 60 (60a to 60d) as the braking mechanisms 30; and two command units 70 (70f, 70r). In the braking control device 50, the four drive units 60 and the two command units 70 correspond to a CPU. However, the command unit 70 may be a hardware circuit that is designed specifically.

The drive unit 60 controls the corresponding braking mechanism 30. That is, of the four drive units 60a, the drive unit 60a controls the braking mechanism 30a of the four braking mechanisms 30. In addition, the drive unit 60b controls the braking mechanism 30b, the drive unit 60c controls the braking mechanism 30c, and the drive unit 60d controls the braking mechanism 30d. The drive unit 60 is arranged near the corresponding braking mechanism 30. The drive unit 60 and the braking mechanism 30 that correspond to each other are preferably unitized. For example, the drive unit 60a is preferably unitized with the braking mechanism 30a.

The drive unit 60 drives the corresponding braking mechanism 30 according to a command value indicating a magnitude of the braking force to be applied to the wheel 20. In this way, each of the braking forces applied to the four wheels 20 is regulated. For example, the drive unit 60a drives the braking mechanism 30a for the right front wheel according to the braking force command value to be applied to the right front wheel 20a. In this way, the braking force that is applied to the right front wheel 20a is regulated.

The two command units 70 are mounted to a command control unit 100. The command control unit 100 is an ECU, for example. As illustrated in FIG. 1, the command control unit 100 is a separate unit from the four braking mechanisms 30, to which the four drive units 60 are provided, respectively. In the command control unit 100, the two command units 70 are connected in a mutually communicable manner.

Of the two command units 70, the command unit 70f is connected to the four drive units 60 via communication lines. The command unit 70r is also connected to the four drive units 60 via communication lines. For example, the communication lines for connecting the command unit 70f to the drive units 60 and the communication lines for connecting the command unit 70r to the drive units 60 are partially shared. In another embodiment, both of the communication lines may be completely independent of each other. In the former case, one input/output port is provided to each of the drive units 60 for communication with the two command units 70. In the latter case, two input/output ports are provided to each of the drive units 60 for the communication with the two command units 70.

When a braking request is present, the command unit 70f derives a required braking force as a required value of the braking force of the vehicle 10. For example, in the case where the driver requests generation of the braking force through the operation of the braking operation member 40, the command unit 70f derives the required braking force on the basis of the detection signal output from the stroke sensor 41. Meanwhile, when deceleration of the vehicle 10 is requested from another control device, the command unit 70f determines the presence of the braking request and derives, as the required braking force, the braking force that corresponds to the required deceleration. Next, based on the required braking force, the command unit 70f derives the braking force command value to be applied to each of the four wheels 20. The command unit 70f can transmit the braking force command value to be applied to each of the four wheels 20 to each of the four drive units 60.

The braking force command value to be applied to each of the four wheels 20 is the braking force that is acquired by dividing the required braking force to the four wheels 20. The command values for the four wheels 20 may be the same value or may be different values. The command unit 70f preferably derives the command value for each of the four wheels 20 in consideration of a condition of the vehicle 10, a road surface condition, and the like. During execution of ABS control or the like, a value as a sum of the command values of the braking forces to be applied to the four wheels 20 may be a different value from the required braking force.

The command unit 70f has a diagnostic unit 80f (80) that diagnoses whether the four drive units 60 function normally.

The diagnostic unit 80f diagnoses whether the four drive units 60 function normally through exchange of signals with the four drive units 60.

A description will be made on an example of a method for diagnosing whether the drive unit 60 functions normally. Here, a description will be made on, as an example, a case where the diagnostic unit 80f diagnoses whether the drive unit 60a functions normally.

The diagnostic unit 80f transmits a confirmation signal to the drive unit 60a. When the drive unit 60a is normal, the drive unit 60a transmits, to the diagnostic unit 80f, a response signal to the received confirmation signal. In the case where the diagnostic unit 80f receives the response signal that is a reply to the confirmation signal transmitted to the drive unit 60a, just as described, the diagnostic unit 80f diagnoses that the drive unit 60a functions normally. On the other hand, in the case where the diagnostic unit 80f cannot receive the response signal that is the reply to the confirmation signal transmitted to the drive unit 60a, the diagnostic unit 80f diagnoses that the drive unit 60a does not function normally.

The following cases are examples of a cause that inhibits the diagnostic unit 80f from receiving the response signal from the drive unit 60a.

A case where abnormality occurs to the drive unit 60a, such as failure of the drive unit 60a A case where the communication line that connects the command unit 70f having the diagnostic unit 80f and the drive unit 60a is disconnected A case where the signal exchanged via the communication line is superimposed with noise When the confirmation signal, which is transmitted from the diagnostic unit 80f to the drive unit 60a, is superimposed with the noise, in some cases, the drive unit 60a cannot recognize the received signal as the confirmation signal and does not transmit the response signal to the diagnostic unit 80f. In addition, when the response signal, which is transmitted from the drive unit 60a to the diagnostic unit 80f, is superimposed with the noise, in some cases, the diagnostic unit 80f cannot recognize the received signal as the response signal.

In a similar manner for the drive unit 60a, the diagnostic unit 80f diagnoses whether each of the other drive units 60b to 60d functions normally through the exchange of the signal with each of the other drive units 60b to 60d.

Similar to the command unit 70f, the command unit 70r derives the required braking force when the braking request is present. Next, based on the required braking force, the command unit 70r derives the braking force command value to be applied to each of the four wheels 20. The command unit 70r can transmit the braking force command value to be applied to each of the four wheels 20 to each of the four drive units 60. Similar to the command unit 70f, the command unit 70r has a diagnostic unit 80r (80) that diagnoses whether the four drive units 60 function normally. The diagnostic unit 80r diagnoses whether the four drive units 60 function normally through exchange of signals with the four drive units 60. The command units 70f, 70r share diagnostic results by the diagnostic units 80f, 80r thereof by exchanging information to each other.

The required braking force that is derived by the command unit 70f has the same value as the required braking force that is derived by the command unit 70r. Furthermore, both of the two command units 70f, 70r can transmit the command value to each of the four drive units 60a to 60d. Accordingly, even in the case where one command unit of the two command units 70f, 70r can no longer transmit the braking force command value to any drive unit of the four drive units 60a to 60d, the other command unit can transmit the braking force command value to such a drive unit. Regarding this point, it can be said that the braking control device 50 in this embodiment adopts a redundant configuration to occurrence of the abnormality.

Under a situation where the braking control device 50 functions normally, the following transmission modes are available for the two command units 70f, 70r to transmit the braking force command value when the braking request is present. The command unit 70f transmits the braking force command value to each of the drive units 60a, 60b, which respectively correspond to the front wheels 20a, 20b, but does not transmit the braking force command value to each of the drive units 60c, 60d, which respectively correspond to the rear wheels 20c, 20d. Meanwhile, the command unit 70r transmits the braking force command value to each of the drive units 60c, 60d, which respectively correspond to the rear wheels 20c, 20d, but does not transmit the braking force command value to each of the drive units 60a, 60b, which respectively correspond to the front wheels 20a, 20b. Based on these points, the command unit 70f is the CPU for primarily transmitting the braking force command value to each of the front wheels 20a, 20b, and the command unit 70r is the CPU for primarily transmitting the braking force command value to each of the rear wheels 20c, 20d. In other words, the command unit 70f is the CPU that serves as a backup capable of transmitting the braking force command value to each of the rear wheels 20c, 20d, and the command unit 70r is the CPU that serves as a backup capable of transmitting the braking force command value to each of the front wheels 20a, 20b. In this embodiment, the transmission modes of the braking force command value by the two command units 70f, 70r are changed according to a content of the abnormality of the braking control device 50 that is classified on the basis of the diagnostic results by the two diagnostic units 80f, 80r.

<Relationship Between Diagnostic Result by Diagnostic Unit 80 and Backup Control>

Next, a description will be made on a relationship between the diagnostic result by the diagnostic unit 80 and the transmission mode of the braking force command value by the command unit 70 with reference to FIG. 2 and FIG. 3. In order to facilitate understanding of the description, FIG. 2 and FIG. 3 focus on the two command units 70 (71, 72) and the two drive units 60 (61, 62).

Figure 2:
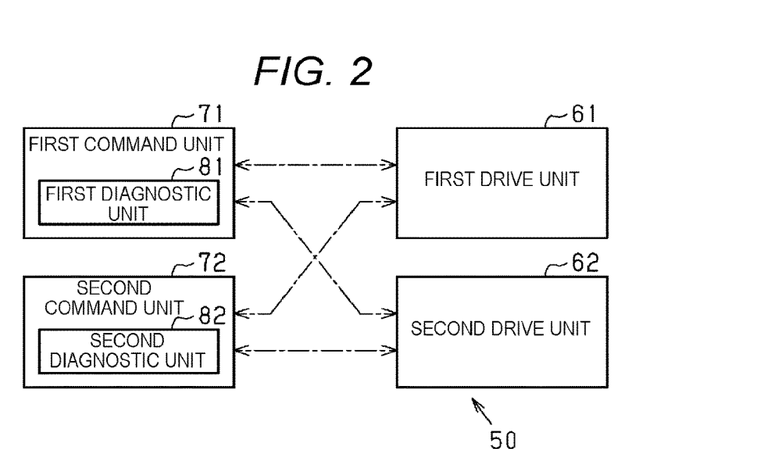
FIG. 2 is a schematic diagram illustrating communication paths between each of a first command unit and a second command unit and each of a first drive unit and a second drive unit.

In FIG. 2, the first command unit 71 corresponds to one of the two command units 70f, 70r, and the second command unit 72 corresponds to the other of the two command units 70f, 70r. In the case where the first command unit 71 corresponds to the command unit 70f, the first drive unit 61 corresponds to the drive unit corresponding to the right front wheel 20a or the left front wheel 20b, and the second drive unit 62 corresponds to the drive unit corresponding to the right rear wheel 20c or the left rear wheel 20d. In the above case, the wheel 20 and the braking mechanism 30 corresponding to the first drive unit 61 respectively correspond to a "first wheel" and a "first braking mechanism", and the wheel 20 and the braking mechanism 30 corresponding to the second drive unit 62 respectively correspond to a "second wheel" and a "second braking mechanism".

Figure 3:
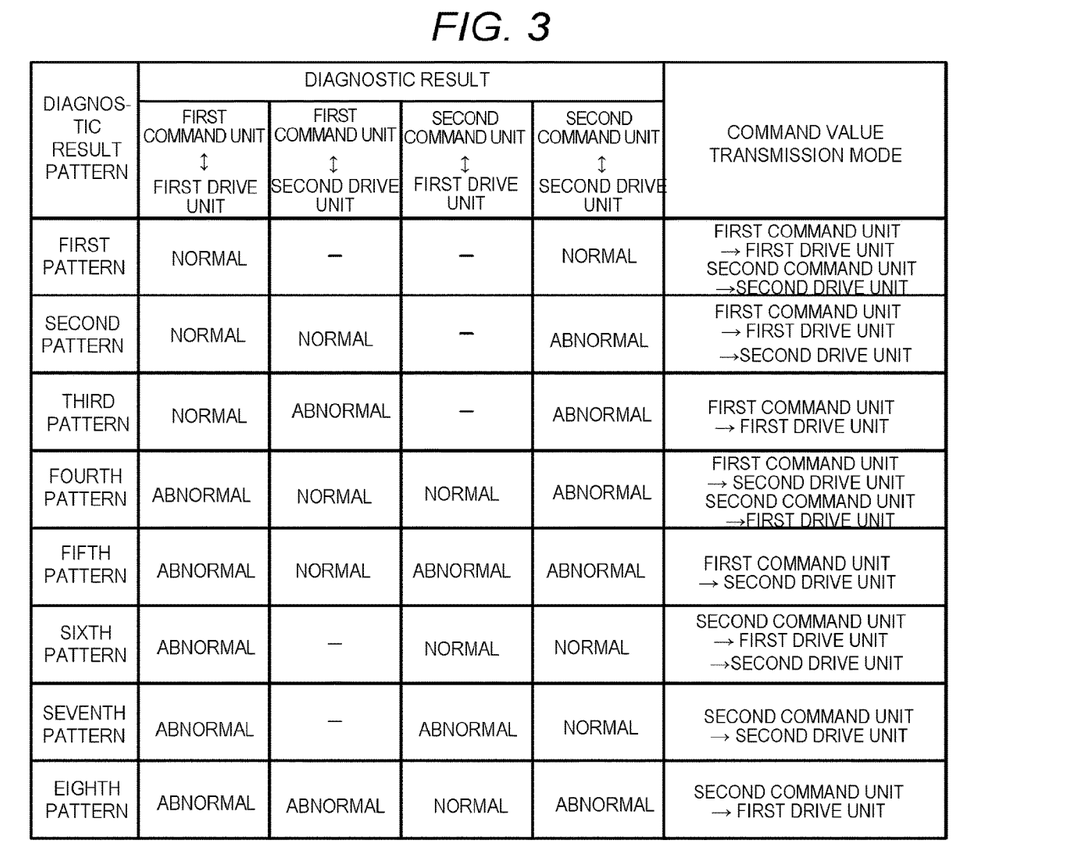
FIG. 3 is a table illustrating relationships between diagnostic result patterns and command value transmission modes.

Eight patterns illustrated in FIG. 3 are provided as diagnostic result patterns by the diagnostic unit 80.

A first pattern corresponds to a case where a first diagnostic unit 81 diagnoses that the first drive unit 61 functions normally and where a second diagnostic unit 82 diagnoses that the second drive unit 62 functions normally. When the diagnostic result pattern is the first pattern, the first command unit 71 transmits, to the first drive unit 61, a first command value that is the braking force command value to be applied to the first wheel. In addition, the second command unit 72 transmits, to the second drive unit 62, a second command value that is the braking force command value to be applied to the second wheel. Meanwhile, the first command unit 71 does not transmit the second command value to the second drive unit 62. Similarly, the second command unit 72 does not transmit the first command value to the first drive unit 61.

Then, the first drive unit 61 drives the first braking mechanism according to the first command value transmitted by the first command unit 71. The second drive unit 62 drives the second braking mechanism according to the second command value transmitted by the second command unit 72. In the first pattern, neither the diagnostic result of the second drive unit 62 by the first diagnostic unit 81 nor the diagnostic result of the first drive unit 61 by the second diagnostic unit 82 affects the command value transmission modes by the first command unit 71 and the second command unit 72.

A second pattern corresponds to a case where the first diagnostic unit 81 diagnoses that both the first drive unit 61 and the second drive unit 62 function normally and where the second diagnostic unit 82 diagnoses that the second drive unit 62 does not function normally. When the diagnostic result pattern is the second pattern, it can be assumed that abnormality occurs to communication between the second command unit 72 and the second drive unit 62 despite a fact that the second drive unit 62 itself is normal. When the diagnostic result pattern is the second pattern, the first command unit 71 transmits the first command value to the first drive unit 61 and transmits the second command value to the second drive unit 62. Meanwhile, the second command unit 72 does not transmit the first command value to the first drive unit 61. Similarly, the second command unit 72 does not transmit the second command value to the second drive unit 62.

Then, the first drive unit 61 drives the first braking mechanism according to the first command value transmitted by the first command unit 71. The second drive unit 62 drives the second braking mechanism according to the second command value transmitted by the first command unit 71. In the second pattern, the diagnostic result of the first drive unit 61 by the second diagnostic unit 82 does not affect the command value transmission modes by the first command unit 71 and the second command unit 72.

A third pattern corresponds to a case where the first diagnostic unit 81 diagnoses that the first drive unit 61 functions normally and where both the first diagnostic unit 81 and the second diagnostic unit 82 diagnose that the second drive unit 62 does not function normally. When the diagnostic result pattern is the third pattern, it can be assumed that the abnormality occurs to the second drive unit 62. When the diagnostic result pattern is the third pattern, the first command unit 71 increases the first command value according to a magnitude of the second command value. In other words, the first command unit 71 increases and corrects the first command value according to the magnitude of the second command value. An increase correction amount of the first command value in this case may be the same amount as the second command value derived by the first command unit 71 or may be a product of the second command value and a predetermined rate. The predetermined rate is preferably a positive value less than 1. Then, the first command unit 71 transmits the corrected first command value to the first drive unit 61. In this case, the first command unit 71 does not transmit the second command value to the second drive unit 62. In addition, the second command unit 72 does not transmit the first command value to the first drive unit 61. Similarly, the second command unit 72 does not transmit the second command value to the second drive unit 62.

Then, the first drive unit 61 drives the first braking mechanism according to the first command value transmitted by the first command unit 71. In this case, the first wheel is applied with the braking force that should be distributed to the second wheel in addition to the braking force distributed to the first wheel. Meanwhile, since the second command value is not transmitted to the second drive unit 62, the second braking mechanism is not driven. As a result, the braking force is not applied to the second wheel. In the third pattern, the diagnostic result of the first drive unit 61 by the second diagnostic unit 82 does not affect the command value transmission modes by the first command unit 71 and the second command unit 72.

A fourth pattern corresponds to a case where the first diagnostic unit 81 diagnoses that the first drive unit 61 does not function normally and that the second drive unit 62 functions normally. The fourth pattern also corresponds to a case where the second diagnostic unit 82 diagnoses that the first drive unit 61 functions normally and that the second drive unit 62 does not function normally. When the diagnostic result pattern is the fourth pattern, it can be assumed that the abnormality occurs to communication between the first command unit 71 and the first drive unit 61 despite a fact that the first drive unit 61 itself is normal. It can also be assumed that the abnormality occurs to the communication between the second command unit 72 and the second drive unit 62 despite the fact that the second drive unit 62 itself is normal. When the diagnostic result pattern is the fourth pattern, the first command unit 71 transmits the second command value to the second drive unit 62, and the second command unit 72 transmits the first command value to the first drive unit 61. Meanwhile, the first command unit 71 does not transmit the first command value to the first drive unit 61. Similarly, the second command unit 72 does not transmit the second command value to the second drive unit 62.

Then, the first drive unit 61 drives the first braking mechanism according to the first command value transmitted by the second command unit 72. The second drive unit 62 drives the second braking mechanism according to the second command value transmitted by the first command unit 71.

A fifth pattern corresponds to a case where the first diagnostic unit 81 diagnoses that the first drive unit 61 does not function normally and that the second drive unit 62 functions normally. The fifth pattern also corresponds to a case where the second diagnostic unit 82 diagnoses that none of the first drive unit 61 and the second drive unit 62 functions normally. When the diagnostic result pattern is the fifth pattern, it can be predicted that the abnormality occurs to the first drive unit 61. It can also be predicted that the abnormality occurs to the communication between the second command unit 72 and the second drive unit 62 despite the fact that the second drive unit 62 itself is normal. When the diagnostic result pattern is the fifth pattern, the first command unit 71 increases the second command value according to a magnitude of the first command value. In other words, the first command unit 71 increases and corrects the second command value according to the magnitude of the first command value. An increase correction amount of the second command value in this case may be the same amount as the first command value derived by the first command unit 71 or may be a product of the first command value and a predetermined rate. The predetermined rate is preferably a positive value less than 1. Then, the first command unit 71 transmits the corrected second command value to the second drive unit 62. In this case, the first command unit 71 does not transmit the first command value to the first drive unit 61. In addition, the second command unit 72 does not transmit the first command value to the first drive unit 61. Similarly, the second command unit 72 does not transmit the second command value to the second drive unit 62.

Then, the second drive unit 62 drives the second braking mechanism according to the second command value transmitted by the first command unit 71. In this case, the second wheel is applied with the braking force that should be distributed to the first wheel in addition to the braking force distributed to the second wheel. Meanwhile, since the first command value is not transmitted to the first drive unit 61, the first braking mechanism is not driven. As a result, the braking force is not applied to the first wheel.

A sixth pattern corresponds to a case where the first diagnostic unit 81 diagnoses that the first drive unit 61 does not function normally and where the second diagnostic unit 82 diagnoses that both the first drive unit 61 and the second drive unit 62 function normally. When the diagnostic result pattern is the sixth pattern, the first command unit 71 does not transmit the first command value to the first drive unit 61. Similarly, the first command unit 71 does not transmit the second command value to the second drive unit 62. Meanwhile, the second command unit 72 transmits the first command value to the first drive unit 61 and transmits the second command value to the second drive unit 62.

Then, the first drive unit 61 drives the first braking mechanism according to the first command value transmitted by the second command unit 72. In addition, the second drive unit 62 drives the second braking mechanism according to the second command value transmitted by the second command unit 72.

A seventh pattern corresponds to a case where both the first diagnostic unit 81 and the second diagnostic unit 82 diagnose that the first drive unit 61 does not function normally and where the second diagnostic unit 82 diagnoses that the second drive unit 62 functions normally. When the diagnostic result pattern is the seventh pattern, the second command unit 72 increases the second command value according to the magnitude of the first command value. Then, the second command unit 72 transmits the corrected second command value to the second drive unit 62. In this case, the second command unit 72 does not transmit the first command value to the first drive unit 61. The first command unit 71 does not transmit the first command value to the first drive unit 61, either. Similarly, the first command unit 71 does not transmit the second command value to the second drive unit 62.

Then, the second drive unit 62 drives the second braking mechanism according to the second command value transmitted by the second command unit 72. In this case, the second wheel is applied with the braking force that should be distributed to the first wheel in addition to the braking force distributed to the second wheel. Meanwhile, since the first command value is not transmitted to the first drive unit 61, the first braking mechanism is not driven. As a result, the braking force is not applied to the first wheel.

An eighth pattern corresponds to a case where the first diagnostic unit 81 diagnoses that none of the first drive unit 61 and the second drive unit 62 functions normally. It also corresponds to a case where the second diagnostic unit 82 diagnoses that the first drive unit 61 functions normally and that the second drive unit 62 does not function normally. When the diagnostic result pattern is the eighth pattern, the second command unit 72 increases the first command value according to the magnitude of the second command value. Then, the second command unit 72 transmits the corrected first command value to the first drive unit 61. In this case, the second command unit 72 does not transmit the second command value to the second drive unit 62. In addition, the first command unit 71 does not transmit the first command value to the first drive unit 61. Similarly, the first command unit 71 does not transmit the second command value to the second drive unit 62.

Then, the first drive unit 61 drives the first braking mechanism according to the first command value transmitted by the second command unit 72. In this case, the first wheel is applied with the braking force that should be distributed to the second wheel in addition to the braking force distributed to the first wheel. Meanwhile, since the second command value is not transmitted to the second drive unit 62, the second braking mechanism is not driven. As a result, the braking force is not applied to the second wheel.

As it has been described so far, in the case where the diagnostic result pattern is not the first pattern, it can be determined that the braking control device 50 does not function normally. In such a case, the first command unit 71 and the second command unit 72 compensate for a shortage of the required braking force caused by accompanying that the braking control device 50 not functioning normally. In the following description, processing that is executed by at least one of the first command unit 71 and the second command unit 72 to compensate for the shortage of the required braking force, just as described, will be referred to as "backup control".

<Processing Flow in Classifying Diagnostic Result Patterns>

Figure 4:
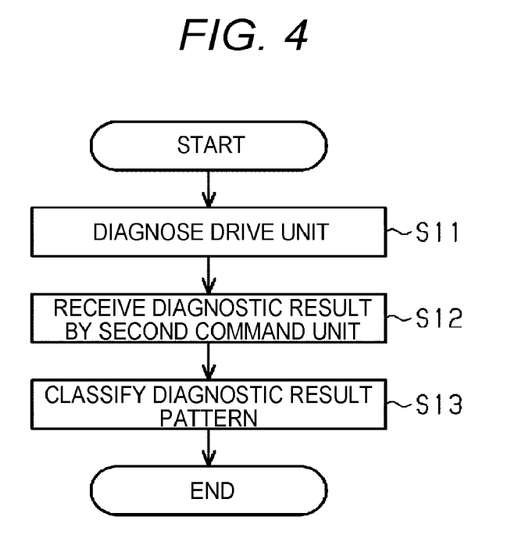
FIG. 4 is a flowchart illustrating a series of processing flows executed when the diagnostic result pattern is classified.

A description will be made on a flow of processing, which is executed by the first command unit 71 in predetermined control cycles when the braking request is not input to the braking control device 50, with reference to FIG. 4. Similar processing to the series of such processing is executed by the second command unit 72. In the description with reference to FIG. 4, one of the two command units 70f, 70r corresponds to the first command unit 71, and the other corresponds to the second command unit 72.

In the series of the processing, in first step S11, the first command unit 71 diagnoses whether the drive unit 60 functions normally for each of the drive units 60. Thereafter, in step S12, the first command unit 71 communicates with the second command unit 72 and thereby acquires the diagnostic results of the four drive units 60 by the second diagnostic unit 82 in the second command unit 72.

The second command unit 72 also diagnoses whether the drive unit 60 functions normally for each of the drive units 60. Then, the second command unit 72 communicates with the first command unit 71 and thereby acquires the diagnostic results of the four drive units 60 by the first diagnostic unit 81 in the first command unit 71.

In step S13, the first command unit 71 classifies the diagnostic result pattern on the basis of the diagnostic result by the first diagnostic unit 81 and the diagnostic result by the second diagnostic unit 82. For example, the first command unit 71 classifies the diagnostic result pattern by referring to a table such as the one in FIG. 3. Then, in the case where the diagnostic result pattern is the first pattern, the first diagnostic unit 81 in the first command unit 71 can determine that the braking control device 50 functions normally. Meanwhile, in the case where the diagnostic result pattern is the pattern other than the first pattern, the first diagnostic unit 81 in the first command unit 71 can determine that the braking control device 50 does not function normally. Thereafter, the first command unit 71 terminates the series of the processing once.

Similar to the first diagnostic unit 81, the second diagnostic unit 82 in the second command unit 72 also classifies the diagnostic result pattern. The result of the classification by the second diagnostic unit 82 is the same as the result of the classification by the first diagnostic unit 81.

<Processing Flow in Executing Backup Control>

Figure 5:
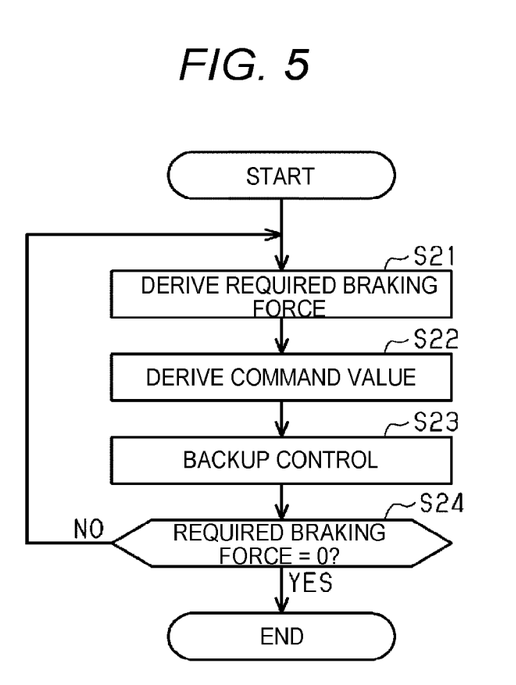
FIG. 5 is a flowchart illustrating a series of processing flows executed when a braking request is present under a situation where some abnormality occurs to the braking control device.

A description will be made on a flow of processing, which is executed by the first command unit 71 when the braking control device 50 receives the braking request, with reference to FIG. 5. A series of the processing illustrated in FIG. 5 is processing that is started when the braking request is present under a situation where some abnormality occurs to the braking control device 50. Similar processing to the series of such processing is executed by the second command unit 72. In the description with reference to FIG. 5, one of the two command units 70f, 70r corresponds to the first command unit 71, and the other corresponds to the second command unit 72.

In the series of the processing, in first step S21, the first command unit 71 derives the required braking force. Next, in step S22, based on the required braking force, the first command unit 71 derives the braking force command value to be applied to each of the four wheels 20. That is, the first command unit 71 derives the first command value and the second command value. Here, the first command unit 71 derives each of the command values under the assumption that the braking control device 50 functions normally.

Then, in step S23, the first command unit 71 executes the backup control. The first command unit 71 executes the backup control that corresponds to the diagnostic result pattern classified through the execution of the series of the processing illustrated in FIG. 4. For example, when the diagnostic result pattern is the second pattern, the first command unit 71 transmits the first command value to the first drive unit 61 and transmits the second command value to the second drive unit 62. When the diagnostic result pattern is the fifth pattern, the first command unit 71 increases and corrects the second command value according to the magnitude of the first command value, and transmits the increased and corrected second command value to the second drive unit 62.

After the backup control is executed, just as described, the first command unit 71 allows the processing to proceed to step S24. In step S24, the first command unit 71 determines whether the required braking force is 0 (zero). That is, the first command unit 71 determines whether the braking request is no longer present. If the required braking force is larger than 0 (zero) (S24: NO), it can be determined that the braking request is still present, and thus the first command unit 71 allows the processing to proceed to step S21. On the other hand, if the required braking force is 0 (zero) (S24: YES), it can be determined that the braking request is no longer present, and thus the first command unit 71 terminates the series of the processing.

Action and Effects in this Embodiment

When the braking control device 50 does not function normally, it may not be possible to apply the same magnitude of the braking force as the required braking force to the vehicle 10. In regard to this point, when it is diagnosed that the braking control device 50 does not function normally, the braking control device 50 executes the backup control.

For example, in the case where the abnormality occurs to the communication between the command unit 70f and the drive unit 60a, the command unit 70f can no longer transmit the braking force command value to the drive unit 60a, and thus the braking force is no longer applied to the right front wheel 20a. In this case, as the backup control, the braking force command value is transmitted from the command unit 70r to the drive unit 60a. Accordingly, the drive unit 60a can drive the braking mechanism 30a on the basis of the command value transmitted by the command unit 70r. Thus, even in the case where the abnormality occurs to the communication between the command unit 70f and the drive unit 60a, the braking force can be applied to the right front wheel 20a.

In addition, when the abnormality occurs to the drive unit 60a, the drive unit 60a can still receive the command value transmitted by the command unit 70f but can no longer drive the braking mechanism 30a. In this case, as the backup control, the transmission of the command value to the drive unit 60a is stopped, and then the command value to be transmitted to the drive unit other than the drive unit 60a, such as the drive unit 60c, is increased. In detail, the command value to the drive unit 60c is increased and corrected according to a magnitude of the command value to the drive unit 60a. Then, the increased and corrected command value is transmitted to the drive unit 60c. Thereafter, the braking mechanism 30c is driven according to the increased and corrected command value. As a result, the braking force applied to the right rear wheel 20c is increased. Thus, even when the braking force cannot be applied to the right front wheel 20a, it is possible to suppress a discrepancy between the actual braking force of the vehicle 10 and the required braking force.

From what have been described so far, the backup control is executed when the braking control device 50 does not function normally. In this way, it is possible to suppress a shortage of the braking force, which is caused by the braking control device 50 not functioning normally. Therefore, even in the case where some abnormality occurs to the braking control device 50, the braking force of the vehicle 10 can be regulated in a manner to meet the intention of the braking request.

In this embodiment, the following effect can further be exerted.

(1) In the braking control device 50, the diagnostic unit 80, which diagnoses whether the drive unit 60 functions normally, is provided to the command control unit 100. Accordingly, the drive unit 60 can be implemented by the simple CPU that only controls the braking mechanism 30 according to the received braking force command value.

Modified Examples

The above embodiment can be implemented with the following modifications. The above embodiment and the following modified examples can be implemented in combination with each other within the scope that is not technically contradictory.

As described above, the command unit 70f transmits the confirmation signal to the drive units 60a, 60b. In the case where the drive units 60a, 60b can receive the confirmation signal, it can be determined that the command unit 70f functions normally. On the other hand, in the case where the drive units 60a, 60b cannot receive the confirmation signal, it can be determined that the command unit 70f does not function normally. Thus, each of the drive units 60a, 60b may diagnose whether the command unit 70f functions normally on the basis of whether the confirmation signal can be received. Then, in the case where the drive units 60a, 60b diagnose that the command unit 70f does not function normally, the drive units 60a, 60b may request the command unit 70r to transmit the command value and may drive the braking mechanisms 30a, 30b, respectively, according to the command value transmitted by the command unit 70r. In this way, even when the abnormality occurs to the command unit 70f, the braking mechanisms 30a, 30b can be driven. In this case, it can be said that the drive units 60a, 60b each have some of the function of the "diagnostic unit". Here, in the case where the drive units 60a, 60b can receive the confirmation signal from the command unit 70f, the drive units 60a, 60b may not accept the command value from the command unit 70r. According to this, even when the abnormality occurs to the command unit 70r, which in turn transmits the abnormal command value to the drive units 60a, 60b, the drive units 60a, 60b can drive the braking mechanisms 30a, 30b, respectively, according to the command value of the command unit 70f, which is normal.

As described above, the command unit 70r transmits the confirmation signal to the drive units 60c, 60d. In the case where the drive units 60c, 60d can each receive the confirmation signal, it can be determined that the command unit 70r functions normally. On the other hand, in the case where the drive units 60c, 60d cannot receive the confirmation signal, it can be determined that the command unit 70r does not function normally. Thus, each of the drive units 60c, 60d may diagnose whether the command unit 70r functions normally on the basis of whether the confirmation signal can be received. Then, in the case where the drive units 60c, 60d diagnose that the command unit 70r does not function normally, the drive units 60c, 60d may request the command unit 70f to transmit the command value and may drive the braking mechanisms 30c, 30d, respectively, according to the command value transmitted by the command unit 70f. In this way, even when the abnormality occurs to the command unit 70r, the braking mechanisms 30c, 30d can be driven. In this case, it can be said that the drive units 60c, 60d each have some of the function of the "diagnostic unit". Here, in the case where the drive units 60c, 60d can receive the confirmation signal from the command unit 70r, the drive units 60c, 60d may not accept the command value from the command unit 70f. According to this, even when the abnormality occurs to the command unit 70f, which in turn transmits the abnormal command value to the drive units 60c, 60d, the drive units 60c, 60d can drive the braking mechanisms 30c, 30d, respectively, according to the command value of the command unit 70r, which is normal.

The diagnostic unit 80 may be mounted to a control unit other than the command unit 70. In addition, the command unit 70f and the command unit 70r may be mounted to different control units. Furthermore, the command units 70f, 70r and the drive units 60a to 60d may be mounted to the same control unit.

As it has been described with reference to FIG. 2 and FIG. 3, when relationships among the two drive units 60 and the two command units 70 are considered, only one type of the backup control is available for the single diagnostic result pattern. Meanwhile, when relationships among the two command units 70 and the four drive units 60 are considered, plural types of the backup control are available for the single diagnostic result pattern. Hereinafter, as an example, a brief description will be made on the backup control that can be executed by the command unit 70f and the command unit 70r when the two diagnostic units 80 diagnose that the drive unit 60a corresponding to the right front wheel 20a does not function normally.

Firstly, as the backup control, the command unit 70r increases the braking force command value for the drive unit 60c according to the magnitude of the braking force command value for the drive unit 60a. In this case, the braking force that should be applied to the right front wheel 20a is applied to the right rear wheel 20c.

Secondly, as the backup control, the command unit 70r increases the command values of the braking forces for the drive units 60c, 60d according to the magnitude of the braking force command value for the drive unit 60a. In this case, the braking force that should be applied to the right front wheel 20a is distributed and applied to the right rear wheel 20c and the left rear wheel 20d.

Thirdly, as the backup control, the command unit 70f increases the braking force command value for the drive unit 60b according to the magnitude of the braking force command value for the drive unit 60a. Furthermore, as the backup control, the command unit 70r increases the command values of the braking forces for the drive units 60c, 60d according to the magnitude of the braking force command value for the drive unit 60a. In this case, the braking force that should be applied to the right front wheel 20a is distributed and applied to the left front wheel 20b, the right rear wheel 20c, and the left rear wheel 20d.

Fourthly, as the backup control, the command unit 70r increases the braking force command value for the drive unit 60c according to the magnitude of the braking force command value for the drive unit 60a. Furthermore, as the backup control, the command unit 70r increases the braking force command value for the drive unit 60d according to the magnitude of the braking force command value for the drive unit 60b. In this case, the braking force that should be applied to the right front wheel 20a is applied to the right rear wheel 20c, and the braking force that should be applied to the left front wheel 20b is applied to the left rear wheel 20d. Just as described, in the backup control, the drive of the braking mechanism 30b by the drive unit 60b, which is paired with the drive unit 60a diagnosed as not functioning normally, may be limited.

In the above embodiment, the first command unit 71 and the second command unit 72 determine the transmission mode of the braking force command value on the basis of the diagnostic result pattern. Thereafter, without changing the drive unit 60 as a transmission destination of the braking force command value, the first command unit 71 and the second command unit 72 change the magnitude of the braking force command value to be transmitted according to a fluctuation in the required braking force. Meanwhile, the first command unit 71 and the second command unit 72 may also determine whether the diagnostic result pattern is changed when changing the magnitude of the braking force command value to be transmitted according to the fluctuation in the required braking force. Then, when the diagnostic result pattern is changed, the first command unit 71 and the second command unit 72 may change the command value transmission mode. In other words, in the flowcharts illustrated in FIG. 4 and FIG. 5, the first command unit 71 and the second command unit 72 may execute the processing in steps S11 to S13 between step S22 and step S23.

In the case where the first command unit 71 cannot receive the diagnostic result of the drive unit 60 by the second command unit 72 from the second command unit 72, the first command unit 71 may determine that the abnormality occurs to the second command unit 72. In this case, similar to the second pattern or the fifth pattern illustrated in FIG. 3, the first command unit 71 preferably executes the backup control.

The braking mechanism 30 may include a wheel cylinder that presses the friction member 32 harder against the rotary body 31 as the hydraulic pressure is increased. In this case, the electric motor 33 may regulate the force that presses the friction member 32 against the rotary body 31 by regulating the hydraulic pressure in the wheel cylinder.

The diagnostic unit 80 may have an abnormality detection sensor that detects the abnormality of the drive unit 60, the command unit 70, and the communication line. In this case, based on a detection result by the abnormality detection sensor, the diagnostic unit 80 may diagnose whether each of the drive unit 60, the command unit 70, and the communication line functions normally.

In the vehicle 10, the number of the wheels 20 may not be four. For example, the number of the wheels 20 may be two or six.

The drive unit 60 is not limited to one that includes the CPU and ROM and executes software processing. For example, a dedicated hardware circuit may be provided for hardware processing on at least some of those subjected to the software processing in each of the above embodiments. An example of the dedicated hardware circuit is an ASIC. ASIC stands for "Application Specific Integrated Circuit". That is, the drive unit 60 only needs to have any of the following configurations (a) to (c).

(a) A processor that executes all of the above processing according to a program and a program storage device such as ROM for storing the program are provided.

(b) A processor and program storage device that executes some of the above processing according to a program and a dedicated hardware circuit that executes rest of the processing are provided.

(c) A dedicated hardware circuit that executes all of the above processing is provided. Here, the number of a software execution device including the processor and the program storage device and the number of the dedicated hardware circuit may be plural.

The command unit 70 only needs to have any of the configurations (a) to (c).

The invention claimed is:

1. A braking control device for a vehicle, the braking control device being applied to a vehicle including: a first braking mechanism that applies a braking force to a first wheel; and a second braking mechanism that applies a braking force to a second wheel, the braking control device for a vehicle comprising:
   a first drive unit that drives the first braking mechanism according to a first command value and thereby applies the braking force to the first wheel, the first command value being a braking force command value to be applied to the first wheel;
   a second drive unit that drives the second braking mechanism according to a second command value and thereby applies the braking force to the second wheel, the second command value being a braking force command value to be applied to the second wheel;
   a first command unit that derives the first command value and the second command value on the basis of a braking request as a request for the braking force on the vehicle, can transmit the first command value to the first drive unit, and can transmit the second command value to the second drive unit;
   a second command unit that derives the first command value and the second command value on the basis of the braking request, can transmit the first command value to the first drive unit, and can transmit the second command value to the second drive unit; and
   a diagnostic unit that diagnoses whether the braking control device functions normally, wherein
   in the case where the diagnostic unit diagnoses that the braking control device functions normally,
      the first command unit transmits the first command value to the first drive unit,
      the first drive unit drives the first braking mechanism according to the first command value transmitted by the first command unit,
      the second command unit transmits the second command value to the second drive unit, and
      the second drive unit drives the second braking mechanism according to the second command value transmitted by the second command unit, and
   in the case where the diagnostic unit diagnoses that the braking control device does not function normally,
      at least one of the first command unit and the second command unit executes backup control for compensating for a shortage of the braking force of the vehicle for the braking request, which is caused by the braking control device not functioning normally.

2. The braking control device for a vehicle according to claim 1, wherein
   in the case where the diagnostic unit diagnoses that the first drive unit does not function normally, as the backup control, the second command unit transmits, to the second drive unit, the second command value that is increased according to a magnitude of the first command value.

3. The braking control device for a vehicle according to claim 1, wherein
   the diagnostic unit includes:
   a first diagnostic unit that is provided to the first command unit, diagnoses whether the first drive unit functions normally, and diagnoses whether the second drive unit functions normally; and
   a second diagnostic unit that is provided to the second command unit, diagnoses whether the first drive unit functions normally, and diagnoses whether the second drive unit functions normally,
   in the case where the first diagnostic unit diagnoses that the first drive unit functions normally, the second command unit does not transmit the first command value to the first drive unit, and
   in the case where the first diagnostic unit diagnoses that the first drive unit does not function normally, and the second diagnostic unit diagnoses that the first drive unit functions normally, as the backup control, the second command unit transmits the first command value to the first drive unit.

4. The braking control device for a vehicle according to claim 1, wherein in the case where the diagnostic unit diagnoses that the first command unit functions normally, the first drive unit does not accept the first command value transmitted by the second command unit, and drives the first braking mechanism according to the first command value transmitted by the first command unit.

5. The braking control device for a vehicle according to claim 1, wherein the first command unit and the second command unit are mounted to a command control unit, and the first drive unit and the second drive unit are mounted to a different unit from the command control unit.

6. The braking control device for a vehicle according to claim 2, wherein in the case where the diagnostic unit diagnoses that the first command unit functions normally, the first drive unit does not accept the first command value transmitted by the second command unit, and drives the first braking mechanism according to the first command value transmitted by the first command unit.

7. The braking control device for a vehicle according to claim 3, wherein in the case where the diagnostic unit diagnoses that the first command unit functions normally, the first drive unit does not accept the first command value transmitted by the second command unit, and drives the first braking mechanism according to the first command value transmitted by the first command unit.

8. The braking control device for a vehicle according to claim 2, wherein the first command unit and the second command unit are mounted to a command control unit, and the first drive unit and the second drive unit are mounted to a different unit from the command control unit.

9. The braking control device for a vehicle according to claim 3, wherein the first command unit and the second command unit are mounted to a command control unit, and the first drive unit and the second drive unit are mounted to a different unit from the command control unit.

10. The braking control device for a vehicle according to claim 4, wherein the first command unit and the second command unit are mounted to a command control unit, and the first drive unit and the second drive unit are mounted to a different unit from the command control unit.

* * * * *